US008676570B2

(12) United States Patent
Nelson et al.

(10) Patent No.: US 8,676,570 B2
(45) Date of Patent: Mar. 18, 2014

(54) METHODS, APPARATUS AND ARTICLES OF MANUFACTURE TO PERFORM AUDIO WATERMARK DECODING

(75) Inventors: Daniel J. Nelson, Tampa, FL (US); Venugopal Srinivasan, Palm Harbor, FL (US); John C. Peiffer, New Port Richey, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 840 days.

(21) Appl. No.: 12/767,422

(22) Filed: Apr. 26, 2010

(65) Prior Publication Data

US 2011/0264455 A1    Oct. 27, 2011

(51) Int. Cl.
*G10L 19/00* (2013.01)
(52) U.S. Cl.
USPC ............ 704/201; 704/200; 704/500; 704/501
(58) Field of Classification Search
USPC .................................. 704/200–201, 500–504
See application file for complete search history.

(56) References Cited

U.S. PATENT DOCUMENTS

| | | | |
|---|---|---|---|
| 4,843,562 A | 6/1989 | Kenyon et al. |
| 5,222,189 A | 6/1993 | Fielder |
| 5,450,490 A | 9/1995 | Jensen et al. |
| 5,465,299 A | 11/1995 | Matsumoto et al. |
| 5,572,558 A | 11/1996 | Beherns |
| 5,675,778 A | 10/1997 | Jones |
| 5,764,763 A | 6/1998 | Jensen et al. |
| 5,945,932 A | 8/1999 | Smith et al. |
| 6,421,445 B1 | 7/2002 | Jensen et al. |
| 6,871,180 B1 | 3/2005 | Neuhauser et al. |
| 6,891,958 B2 | 5/2005 | Kirovski et al. |
| 6,903,664 B2 | 6/2005 | Schroder et al. |
| 6,904,404 B1 | 6/2005 | Norimatsu et al. |
| 7,206,649 B2 | 4/2007 | Kirovski et al. |

(Continued)

FOREIGN PATENT DOCUMENTS

| | | |
|---|---|---|
| JP | 2001188549 | 7/2001 |
| JP | 2004525430 | 8/2004 |

(Continued)

OTHER PUBLICATIONS

"Notice of Reasons for Rejection," issued by the Japan Intellectual Property Office in connection with Japanese patent application No. P2011-098436, on Sep. 18, 2012, 3 pages.

Extended European Search Report, issued by the European Patent Office in connection with European Application No. 11163686.6-2223, on Sep. 4, 2012, 8 pages.

(Continued)

*Primary Examiner* — Douglas Godbold
(74) *Attorney, Agent, or Firm* — Hanley, Flight and Zimmerman, LLC

(57) ABSTRACT

Example methods, apparatus and articles of manufacture to perform audio watermark decoding are disclosed. A disclosed example method includes receiving an audio signal including an audience measurement code embedded therein using a first plurality of frequency components, sampling the audio signal, transforming the sampled audio signal into a first frequency domain representation, determining whether the code is detectable in the first plurality of frequency components of the first frequency domain representation, and when the code is not detected in the first plurality of frequency components, examining a second plurality of frequency components of a second frequency domain representation to determine whether the code is detected, the second plurality of frequency components being offset from the first plurality of frequency components by a first offset, the first offset corresponding to a sampling frequency mismatch.

21 Claims, 7 Drawing Sheets

(56) References Cited

U.S. PATENT DOCUMENTS

| | | | |
|---|---|---|---|
| 7,266,697 B2 | 9/2007 | Kirovski et al. | |
| 8,041,073 B2 * | 10/2011 | Baum et al. | 382/100 |
| 2005/0097334 A1 | 5/2005 | Kirovski et al. | |
| 2006/0111913 A1 | 5/2006 | Oh | |
| 2006/0174348 A1 | 8/2006 | Rhoads et al. | |
| 2006/0205437 A1 | 9/2006 | Sung et al. | |
| 2007/0104149 A1 | 5/2007 | Khan et al. | |
| 2008/0170545 A1 | 7/2008 | Kim et al. | |
| 2009/0157204 A1 | 6/2009 | Smith et al. | |

FOREIGN PATENT DOCUMENTS

| | | |
|---|---|---|
| JP | 2005522080 | 7/2005 |
| JP | 2007104598 | 4/2007 |
| JP | 2008529046 | 7/2008 |
| JP | 2009128590 | 6/2009 |
| JP | 2009188998 | 8/2009 |

OTHER PUBLICATIONS

"Notification of Completion of Formalities for Patent Registration," issued by the State Intellectual Property Office of China, in connection with Chinese patent application No. 201110105251.2, on Sep. 3, 2012, 3 pages.

First Notification of Office Action, issued by the State Intellectual Property Office of China, P.R., in connection with Chinese Patent Application No. 201110105251.2, on Mar. 28, 2012, 5 pages.

Bender et al., "Techniques for Data Hiding," IBM Systems Journal, vol. 35, Nos. 3 & 4, 1996 (pp. 313-336).

"Patent Examination Report No. 1," issued by the Australian Government in connection with Australian Patent Application No. 2011201838, on Feb. 19, 2013, 3 pages.

Notification of Reason(s) for Rejection with English Translation, issued by the Japanese Intellectual Property Office in connection with Japanese Patent Application No. 2011-098436, on Aug. 13, 2013, 4 pages.

* cited by examiner

METHODS, APPARATUS AND ARTICLES OF MANUFACTURE TO PERFORM AUDIO WATERMARK DECODING

FIELD OF THE DISCLOSURE

This disclosure relates generally to media monitoring and, more particularly, to methods, apparatus and articles of manufacture to perform audio watermark decoding.

BACKGROUND

Identifying media content (e.g., television (TV) programs, radio programs, advertisements, commentary, audio/video content, movies, commercials, advertisements, etc.) is useful for assessing audience exposure to such content. For example, in audience metering applications, a code or watermark may be inserted or embedded in the audio or video of media content (e.g., a program or advertisement), wherein the code/watermark is later detected at one or more monitoring sites when the media content is presented (e.g., played at monitored households). The information payload of the code/watermark embedded into an original signal can include unique program identification, source identification, broadcaster information, and/or time of broadcast. Monitoring sites may include locations such as, households, stores, places of business and/or any other public and/or private facilities, where media content exposure and/or consumption of media content is monitored. For example, at a monitoring site, codes/watermarks from the audio and/or video are captured. The collected codes/watermarks may be sent to a central data collection facility for analysis such as the computation of content consumption statistics.

DETAILED DESCRIPTION

Figure 1:
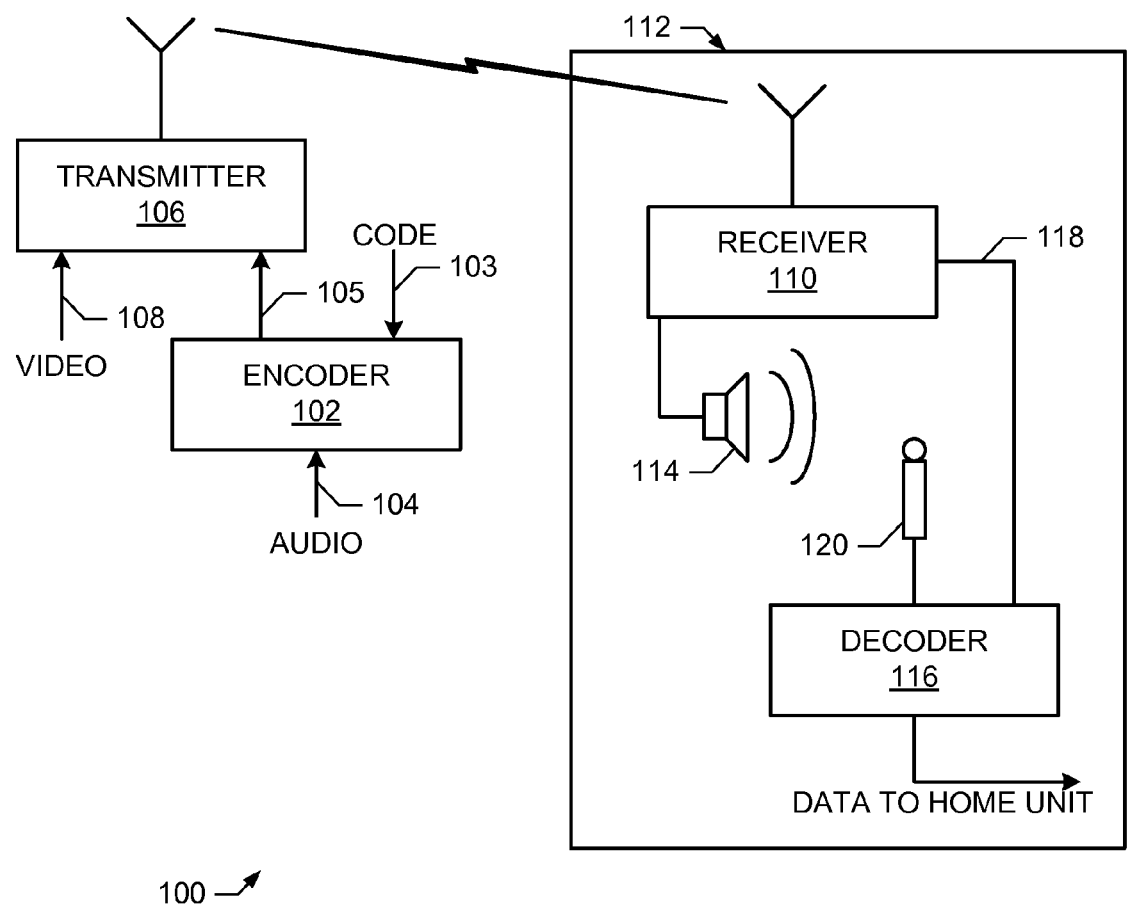
FIG. 1 is a schematic illustration of an example broadcast audience measurement system employing an identification code embedded in the audio portion of a composite television signal.

Example methods, apparatus and articles of manufacture to perform audio watermark decoding are disclosed. A disclosed example method includes receiving an audio signal including an audience measurement code embedded therein using a first plurality of frequency components, sampling the audio signal, transforming the sampled audio signal into a first frequency domain representation, determining whether the code is detectable in the first plurality of frequency components of the first frequency domain representation, and when the code is not detected in the first plurality of frequency components, examining a second plurality of frequency components of a second frequency domain representation to determine whether the code is detected, the second plurality of frequency components being offset from the first plurality of frequency components by a first offset, the first offset corresponding to a sampling frequency mismatch.

A disclosed example apparatus includes an audio input interface to an audio signal including an audience measurement code embedded therein using a first plurality of frequency components, a sampler to sample the audio signal, a time-to-frequency domain converter to transform the sampled audio signal into a first frequency domain representation, and a frequency domain decoder. The frequency domain decoder to determine whether the code is detectable in the first plurality of frequency components of the first frequency domain representation, and when the code is not detected in the first plurality of frequency components, examine a second plurality of frequency components of a second frequency domain representation to determine whether the code is detected, the second plurality of frequency components being offset from the first plurality of frequency components by a first offset, the first offset corresponding to a sampling frequency mismatch.

The following description makes reference to audio encoding and decoding that is also known as audio watermarking and watermark detection, respectively. It should be noted that in this context, audio is any type of signal having a frequency falling within the normal human audibility spectrum. For example, audio may be speech, music, an audio portion of an audio and/or video program (e.g., a television (TV) program, a movie, an Internet video, a radio program, a commercial spot, etc.), noise, or any other sound.

In general, encoding of audio refers to inserting one or more codes into the audio. In some examples the code is psycho-acoustically masked so that the code is inaudible to human hearers of the audio. However, there may be certain situations in which the code may be audible to certain human listeners. These codes may also be referred to as watermarks. The codes that are embedded in audio may be of any suitable length, and any suitable technique for mapping information (e.g., a channel identifier, a station identifier, a broadcaster identifier, a content creator identifier, a content owner identifier, a program identifier, a timestamp, a broadcast identifier, etc.) to the codes may be utilized. Furthermore, the codes may be converted into symbols that are represented by signals having selected frequencies that are embedded in the audio. Any suitable encoding and/or error correcting technique may be used to convert codes into symbols. Some examples of such audience measurement codes include Nielsen codes that are proprietary to The Nielsen Company (US), LLC, the assignee of the present patent. A Nielsen code is any code embedded into any media content by and/or in association with The Nielsen Company (US), LLC or any affiliate(s) of The Nielsen Company (US), LLC. In the examples described herein, before and/or during transmission and/or broadcasting, media content is encoded to include one or more such codes. When the media content is presented on a content presentation device (e.g., played through a TV, a radio, a computing device, a cellular telephone, a hand-held device, and/or any other suitable device), persons in the area of the presentation are exposed not only to the media content, but, unbeknownst to them, are also exposed to the code(s) embedded in the media content.

While the following examples are described with reference to broadcast audio/video media content (e.g., a TV program, a commercial, a movie, etc.) that include codes embedded and/or encoded into the audio portion thereof, such examples are merely illustrative. For example, codes may, additionally or alternatively, be embedded and/or encoded into other types of media content such as, but not limited to, audio content, video content, graphical content, an image, a game, a survey, and/or a webpage. Further, the methods and apparatus described herein may be used to detect codes embedded in any number and/or type(s) of additional and/or alternative media content (e.g., a radio broadcast, an audio announcement, etc.). Moreover, media content need not be broadcast. For example, media content may be distributed via any number and/or type(s) of tangible medium such as a digital versatile disc (DVD) and/or a compact disc (CD) that includes embedded codes.

An example encoding and decoding system 100 is shown in FIG. 1. The example system 100 of FIG. 1 depicts an example television audience measurement system, which will serve as context for further description of the example decoding processes disclosed herein. The example system 100 of FIG. 1 includes an encoder 102 that adds a code 103 to an audio signal 104 to produce an encoded audio signal 105. The code 103 may be representative of any desired or selected information. For example, in a media monitoring context, the code 103 may be representative of an identity of broadcast media content such as a television broadcast, a radio broadcast, or the like. Additionally, the code 103 may include timing information indicative of a time at which the code 103 was inserted into audio or a media broadcast time.

The audio signal 104 may be any form of audio including, for example, voice, music, noise, commercial advertisement audio, audio associated with a television program, live performance, etc. In the example of FIG. 1, the encoder 102 passes the encoded audio signal 105 to a transmitter 106. The transmitter 106 transmits the encoded audio signal 105 along with any video signal 108 associated with the encoded audio signal 105. While, in some instances, the encoded audio signal 105 may have an associated video signal 108, the encoded audio signal 105 need not have any associated video.

Although the transmit side of the example system 100 shown in FIG. 1 shows a single transmitter 106, the transmit side may be much more complex and may include multiple levels in a distribution chain through which the audio signal 104 may pass. For example, the audio signal 104 may be generated at a national network level and be passed to a local network level for local distribution. Accordingly, although the encoder 102 is shown in the transmit lineup prior to the transmitter 106, one or more encoders may be placed throughout the distribution chain of the audio signal 104. Thus, the audio signal 104 may be encoded at multiple levels and may include multiple embedded codes associated with those multiple levels. An example manner of implementing the example encoder 102 is described below in connection with FIG. 2.

The example transmitter 106 of FIG. 1 may include one or more of a radio frequency (RF) transmitter that may distribute the encoded audio signal through free space propagation (e.g., via terrestrial or satellite communication links) or a transmitter used to distribute the encoded audio signal through cable, fiber, etc. In some examples, the transmitter 106 is used to broadcast the encoded audio signal 105 throughout a broad geographical area. In other cases, the transmitter 106 may distribute the encoded audio signal 105 through a limited geographical area. The transmission may include up-conversion of the encoded audio signal 105 to radio frequencies to enable propagation of the same. Alternatively, the transmission may include distributing the encoded audio signal 105 in the form of digital values or packets of digital values that may be transmitted over one or more networks, such as the Internet, a wide area network, and/or a local area network. Thus, the encoded audio signal 105 may be carried by a carrier signal, by information packets and/or by any suitable technique to distribute audio and/or video signals.

When the example encoded audio signal 105 is received by a receiver 110, which, in the media monitoring context, may be located at a statistically selected metering site 112, the audio signal 105 is processed to recover the code 103, even though the presence of that code 103 is imperceptible (or substantially imperceptible) to a listener when the encoded audio signal 105 is presented by speakers 114 of the receiver 110. To this end, a decoder 116 is connected either directly to an audio output 118 available at the receiver 110 or to a microphone 120 placed in the vicinity of the speakers 114 through which the audio 105 is reproduced. The received audio signal 105 can be either in a monaural or a stereo format. An example manner of implementing the example decoder 116 of FIG. 1 is described below in connection with FIG. 3.

Figure 2:
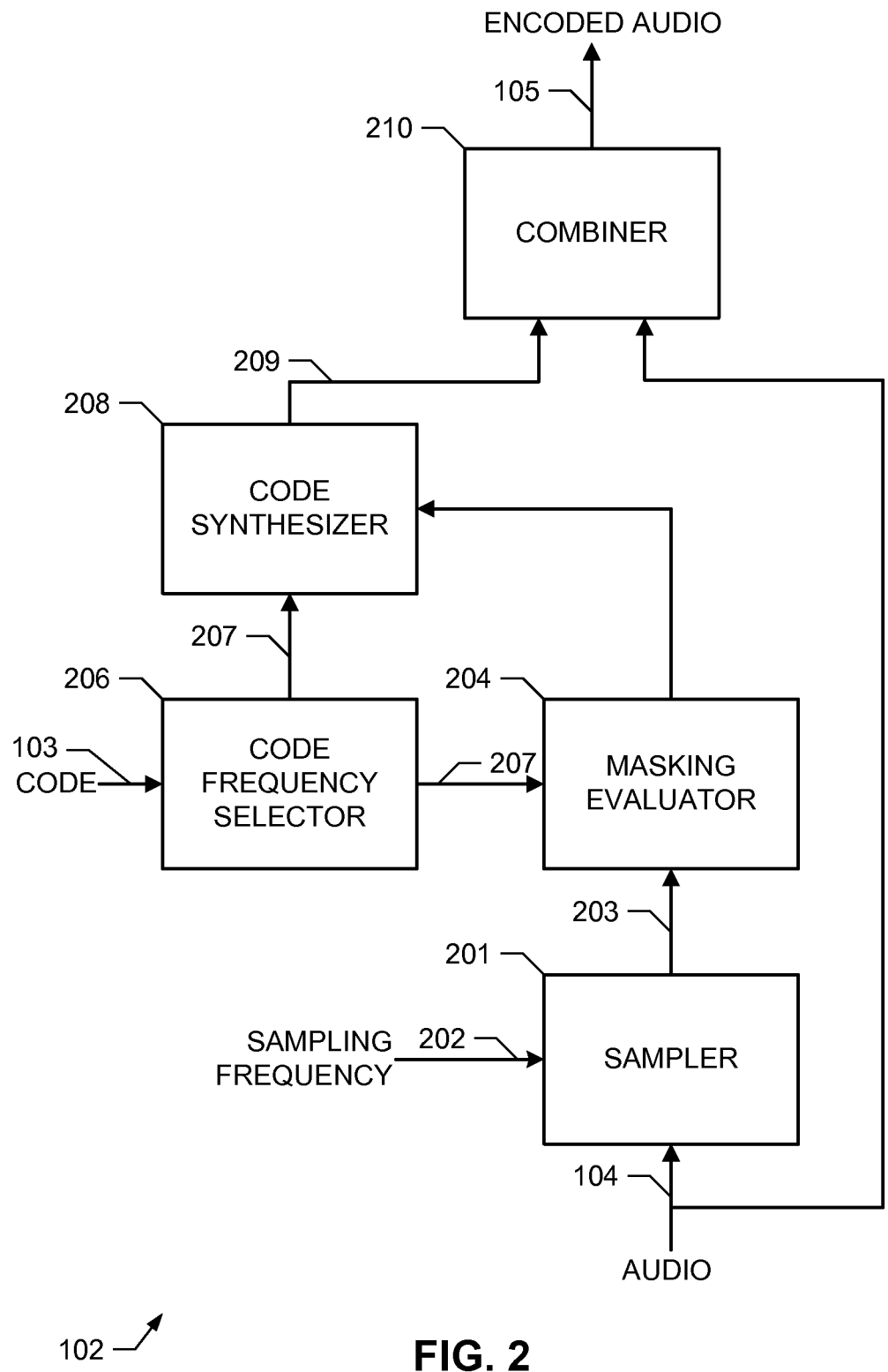
FIG. 2 illustrates an example manner of implementing the example encoder of FIG. 1.

FIG. 2 illustrates an example manner of implementing the example encoder 102 of FIG. 1. As explained above, the example encoder 102 of FIG. 2 inserts one or more inaudible (or substantially inaudible) codes 103 into the audio 104 to create the encoded audio 105. In the illustrated example of FIG. 2, the encoder 102 includes a sampler 201 to sample the audio 104 at a sampling frequency 202 to form a sampled audio signal 203. The example sampler 201 is coupled to a masking evaluator 204, which evaluates the ability of the audio 104 to hide the code 103 therein. The code 103 is provided to a code frequency selector 206 that determines or selects the frequencies that are used to insert or embed the code 103 into the sampled audio 203. The code frequency selector 206 may convert the code 103 into symbols using any suitable detection or correction encoding. An indication 207 of the designated or selected code frequencies that will be used to represent the code 103 are passed to a masking evaluator 204 so that the masking evaluator 204 is aware of the frequencies for which masking of the code 103 by the audio 104 should be determined. Additionally, the indication 207 of the code frequencies is provided to a code synthesizer 208 that produces sine wave signals 209 having frequencies designated by the code frequency selector 206. A combiner 210 receives both the synthesized code frequencies 209 from the code synthesizer 208 and the audio 104 that was provided to the sampler 201 and combines the two to produce the encoded audio 105.

In some examples in which the audio 104 is provided to the encoder 102 in analog form, the example sampler 201 is implemented using an analog-to-digital converter or any other suitable digitizer. The sampler 201 may sample the audio 104 at, for example, 48,000 Hertz (Hz) or any other sampling rate suitable to satisfy the Nyquist criteria. For example, if the audio 104 is frequency-limited at 15,000 Hz, the sampler 201 may operate at a sampling frequency 202 of 30,000 Hz. Each sample 203 from the sampler 201 may be represented by a string of digital bits, wherein the number of bits represents the precision with which the audio 104 is sampled. For example, the sampler 201 may produce 8-bit, 16-bit, 24-bit, or 32-bit values 203.

In addition to sampling the audio 104, the example sampler 201 of FIG. 2 accumulates a number of samples (i.e., an audio block) that are to be processed together. For example, the example sampler 201 may accumulate a 512 sample audio block that is passed to the masking evaluator 204 at one time. Alternatively, the masking evaluator 204 may include an accumulator in which the audio block is accumulated in a buffer before they are processed.

The example masking evaluator 204 of FIG. 2 receives or accumulates the samples (e.g., 512 samples) and determines an ability of the accumulated samples to substantially hide code frequencies from human hearing. That is, the masking evaluator 204 determines whether code frequencies can be hidden within the audio 104 represented by the accumulated samples by, for example, evaluating each critical band of the audio 104 as a whole to determine its energy and determining the noise-like or tonal-like attributes of each critical band and determining the sum total ability of the critical bands to mask the code frequencies. Critical frequency bands, which may be determined by experimental studies carried out on human auditory perception, may vary in width from narrow frequency bands at the low end of the spectrum to wider frequency bands at the upper end of the audible spectrum. If the masking evaluator 204 determines that code frequencies can be hidden in the audio 104, the masking evaluator 204 indicates the amplitude level(s) at which the code frequencies can be inserted within the audio 104, while still remaining substantially hidden, and provides the amplitude information to the code synthesizer 208.

In some examples, the code frequency selector 206 is implemented using a lookup table that relates an input code 103 to a state, wherein each state represents a number of code frequencies that are to be emphasized in the encoded audio signal 105. In other words, input codes 103 can be mapped to code frequencies according to a code frequency mapping table. The code frequency selector 206 may include information relating symbols or data states to sets of code frequencies that redundantly represent the data states. The number of states selected for use may be based on the type(s) of input codes 103. For example, an input code 103 containing two bits may be converted to code frequencies representing one of four symbols or states (e.g., $2^2$). In other examples, an input code 103 containing four bits of information is represented by one of 16 symbols or states (e.g., $2^4$). Some other encoding(s) may additionally or alternatively be used to build in error correction when converting the code 103 to one or more symbols or states. Additionally, in some examples, more than one code 103 may be embedded in the audio 104.

Frequency indices selected using the code frequency mapping table correspond to the frequencies of sine waves to be embedded into the audio signal 104, when the audio signal 104 is represented in the frequency domain via a Fourier transformation of a block of samples. Reference is made to frequency indices rather than actual frequencies because the frequencies to which the indices correspond vary based on the sampling rate 202 used within the encoder 102 and the number of samples processed by the decoder 116. The separation between adjacent frequencies corresponding to adjacent indices is proportional to the ratio of the sampling frequency 202 and the audio block size. For example, at a sampling rate of 48,000 Hz and an audio block size of 18,432 samples, the spacing between the adjacent indices is approximately 2.6 Hz. Thus, a frequency index of 360 corresponds to 936 Hz (2.6 Hz×360). Of course, other sampling rates and block sizes and, thus, frequency separation may be selected. Moreover, not all frequency indices need be used to, for example, avoid interfering with frequencies used to carry other codes and/or watermarks. Moreover, the selected and/or used ranges of frequencies need not be contiguous. In some examples, frequencies in the ranges 0.8 kHz to 1.03 kHz and 2.9 kHz to 4.6 kHz are used. In other examples, frequencies in the ranges 0.75 kHz to 1.03 kHz and 2.9 kHz to 4.4 kHz are used.

The example code synthesizer 208 of FIG. 2 receives from the code frequency selector 206 the indication 207 of the frequency indices to be included to create an encoded audio signal 105 that includes a representation of the input code 103. In response to the indication 207 of the frequency indices, the code synthesizer 208 generates a number of sine waves (or one composite signal including multiple sine waves) having the identified frequencies. The synthesis may result in sine wave signals or in digital data representative of sine wave signals. In some examples, the code synthesizer 208 generates the code frequencies with amplitudes dictated by the masking evaluator 204. In other examples, the code synthesizer 208 generates the code frequencies having fixed amplitudes and those amplitudes may be adjusted by one or more gain blocks (not shown) implemented within the code synthesizer 208 or disposed between the code synthesizer 208 and the combiner 210.

While the foregoing describes an example code synthesizer 208 that generates sine waves or data representing sine waves, other example implementations of code synthesizers are possible. For example, rather than generating sine waves, another example code synthesizer 208 may output frequency domain coefficients that are used to adjust amplitudes of certain frequencies of audio provided to the combiner 210. In this manner, the spectrum of the audio 104 may be adjusted to include the requisite sine waves.

The example combiner 210 of FIG. 2 receives both the output 209 of the code synthesizer 208 and the audio 104 and combines them to form the encoded audio 105. The combiner 210 may combine the output 209 of the code synthesizer 208 and the audio 104 in an analog or digital form. If the combiner 210 performs a digital combination, the output 209 of the code synthesizer 208 may be combined with the output of the sampler 201, rather than the analog audio 104 that is input to the sampler 201. For example, the audio block in digital form may be combined with the sine waves in digital form. Alternatively, the combination may be carried out in the frequency domain, wherein frequency coefficients of the audio 104 are adjusted in accordance with frequency coefficients representing the sine waves. As a further alternative, the sine waves and the audio 104 may be combined in analog form. The encoded audio 105 may be output from the combiner 210 in analog or digital form. If the output 105 of the combiner 210 is digital, it may be subsequently converted to analog form before being coupled to the transmitter 106.

Example methods, apparatus and articles of manufacture that may be used to select code frequencies, to analyze the masking of embedded codes by the audio 104, and/or to implement code frequency mapping tables, the example sampler 201, the example masking evaluator 204, the example code frequency selector 206, the example code synthesizer 208, the example combiner 210 and/or the example encoder 102 are described in U.S. patent application Ser. No. 12/249,619 filed on Oct. 10, 2008, U.S. patent application Ser. No. 12/551,220 filed on Aug. 31, 2009, and U.S. patent application Ser. No. 12/464,811 filed on May 12, 2009, each of which is hereby incorporated by reference in its entirety.

Figure 3:
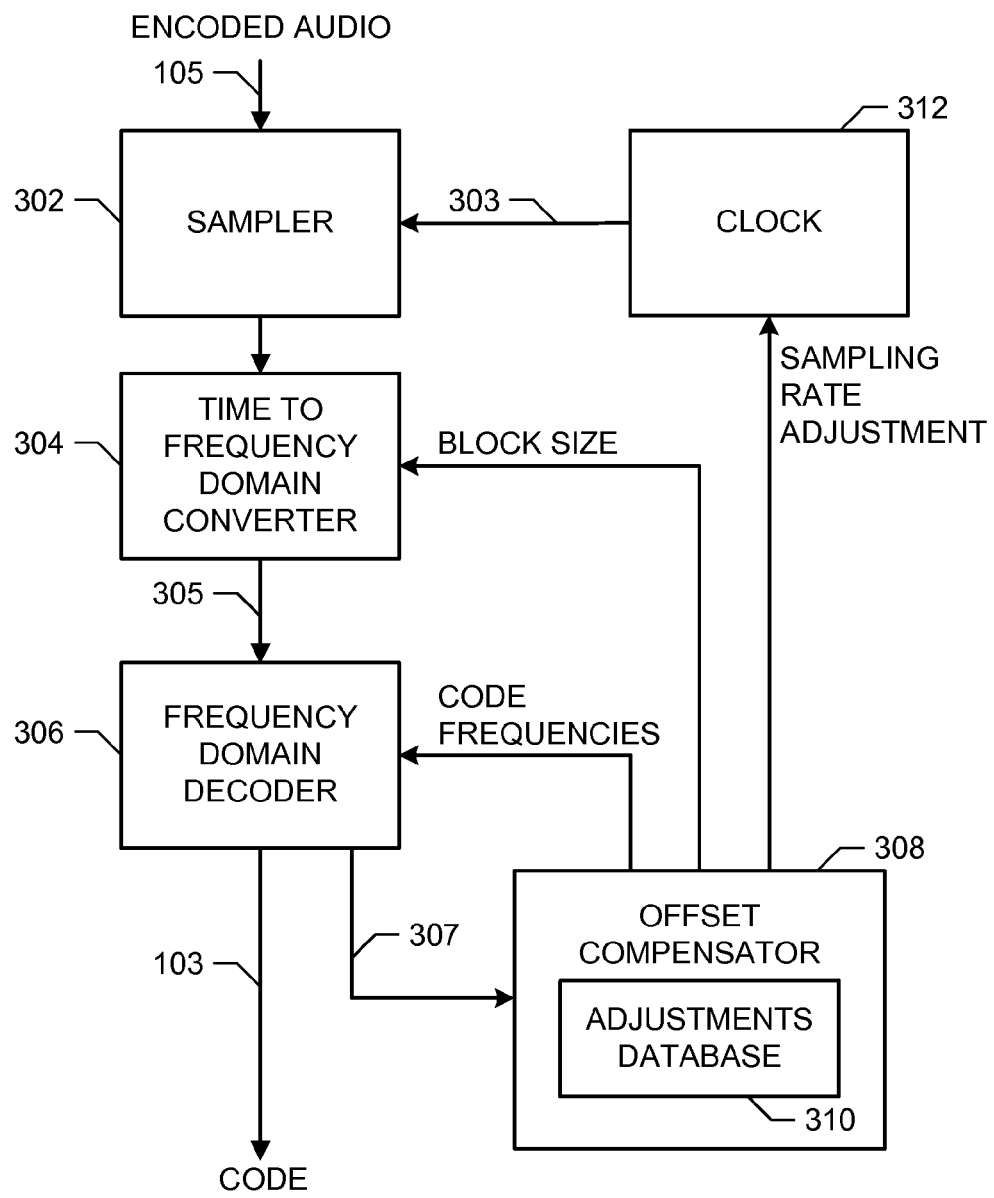
FIG. 3 illustrates an example manner of implementing the example decoder of FIG. 1.

FIG. 3 illustrates an example manner of implementing the example decoder 116 of FIG. 1. The example decoder 116 of FIG. 3 detects, decodes and/or extracts the code(s) 103 that were inserted into the audio 104 to form the encoded audio 105 at the encoder 102. As shown in FIG. 1, the encoded audio 105 may be provided via a wired and/or wireless connection to the receiver 110. While in the following descriptions it is assumed for ease of comprehension that the decoder 116 processes substantially the same encoded audio 105 formed by the encoder 102, in general, the audio processed by the decoder 116 will be different due to, for example, distortion, noise, etc. introduced by the transmitter 106, the receiver 110 and/or any intervening transmission media. Accordingly, in practice such effects are managed by implementing any number and/or type(s) of suitable noise reduction, distortion mitigation and/or error correction techniques.

The example decoder 116 of FIG. 3 includes a sampler 302, which may be implemented using an analog-to-digital converter or any other suitable technology, to which the encoded audio 105 is provided in analog format. The example sampler 302 of FIG. 3 samples the encoded audio 105 at, for example, a nominal sampling frequency 303 of 48,000 Hz. Of course, lower sampling frequencies may be advantageously selected in order to reduce the computational load at the time of decoding. However, the sampling frequency 303 should be selected to satisfy the Nyquist criteria. Moreover, as described below the sampling frequency 303 may be adjusted and/or selected to compensate for any mismatch(es) between any or all of the sampling frequency 202 (FIG. 2), a sampling frequency employed in the receiver 110 to output the encoded audio 105 via the speaker 114, and/or the sampling frequency 303. Such sampling frequency mismatches and/or differences may result in the embedded code(s) 103 appearing at the wrong code frequencies in the decoder 116 and, thus, may impair the ability of the decoder 116 to correctly decode, detect and/or extract the codes 103. The sampling frequency mismatch(es) may be caused by, for example, the use of low cost crystals in the receiver 114 and/or the decoder 116, and/or by crystal aging resulting in resonant frequency drift. Low cost crystals are typically found in consumer grade devices such as personal computers (PCs), or set top boxes, where a slight drift from an ideal center frequency is not noticeable to human ears, but may impact the detection, decoding and/or extraction of embedded codes. Typically, the encoder 102 is implemented using an accurate time base and/or crystal.

The samples from the example sampler 302 are provided to a time to frequency domain converter 304. The example time to frequency domain converter 304 of FIG. 3 is implemented using a discrete Fourier transformation (DFT) or any other suitable technique to convert time-based information into frequency-based information 305. In some examples, the time to frequency domain converter 304 may be implemented using a sliding DFT in which a frequency domain representation or spectrum 305 is calculated each time a new sample is provided to the example time to frequency converter 304 and an old sample is dropped. In some examples, the time to frequency domain converter 304 nominally computes a frequency domain representation 305 for blocks of 18,432 samples of the received encoded audio 105. The resolution of the frequency domain representation 305 produced by the time to frequency domain converter 304 increases as the number of samples used to generate the frequency domain representation 305.

The sampling frequency 303 and the number of samples processed by the time to frequency domain converter 304 are normally selected to match the resolution used to select the frequency indices in the encoder 102. However, as described below, the number of samples processed by the time to frequency domain converter 304 to compute a frequency domain representation 305 may be adjusted and/or selected to compensate for any mismatch(es) between any or all of the sampling frequency 202 (FIG. 2), the sampling frequency employed in the receiver 110 to output the encoded audio 105 via the speaker 114, and/or the sampling frequency 303.

The frequency domain representation 305 produced by the time to frequency domain decoder 304 passes to a frequency domain decoder 306, which monitors all the frequencies or spectral lines corresponding to the frequency indices that can potentially carry the code(s) 103 inserted by the example encoder 102. The example frequency domain decoder 306 looks for a pattern of emphasized code frequencies in the received audio 105. As described below, a different and/or offset set of frequencies may additionally or alternatively be monitored to compensate for any mismatch(es) between any or all of the sampling frequency 202 (FIG. 2), the sampling frequency employed in the receiver 110 to output the encoded audio 105 via the speaker 114, and/or the sampling frequency 303. Once the frequency domain decoder 306 has determined which code frequencies have been emphasized, the frequency domain decoder 306 determines, based on the emphasized code frequencies, the symbol present within the encoded audio 105. The frequency domain decoder 306 may record the symbols, and/or may decode those symbols into the code(s) 103 that were embedded and/or inserted into the audio 105. An indication 307 of whether a valid code 103 was detected, decoded and/or extracted by frequency domain decoder 306 is provided to an offset compensator 308.

Example methods, apparatus and articles of manufacture that may be used to implement the example sampler 302, the example time to frequency domain converter 304 and/or the example frequency domain decoder 306 of FIG. 3 are described in U.S. patent application Ser. No. 12/249,619 filed on Oct. 10, 2008, U.S. patent application Ser. No. 12/551,220 filed on Aug. 31, 2009, and U.S. patent application Ser. No. 12/464,811 filed on May 12, 2009. While these examples may not describe adjustable and/or selectable inputs received from the example offset compensator 308, but instead may be implemented according to pre-selected and/or pre-determined parameters, persons of ordinary skill in the art will readily understand how to modify such examples to accommodate adjustable and/or selectable inputs from the offset compensator 308.

To compensate for frequency offsets, the example decoder 116 of FIG. 3 includes the example offset compensator 308. When the example offset compensator 308 of FIG. 3 does not receive an indication that frequency domain decoder 306 is able to detect, decode and/or extract codes from the encoded audio 105, the example offset compensator 308 adjusts one or more of the sampling frequency 303, the block size used by the time to frequency domain converter 304 and/or the code frequencies considered, examined and/or analyzed by the frequency domain decoder 306.

In some examples, the offset compensator 308 maintains a list 310 of previous frequency offsets that enable correct detection, decoding and/or extraction of the code(s) 103. When an offset enables proper decoding of the code(s) 103, the example offset compensator 308 stores the offset in the list 310. The list 310 may include whether the sampling rate 303, the block size and/or the code frequencies were adjusted and/or selected to implement the offset. In such examples, the offset compensator 308 may first try the previously successful offsets 310 before trying other offsets to achieve proper decoding of the code(s) 103. By first trying previously successfully offsets 310, the time required to begin decoding the code(s) 103 may be reduced. The list 310 may be stored in a non-volatile memory to enable the previously successfully offsets to be recalled after a power-down and/or re-initialization of the decoder 116.

In some examples, the offset compensator 308 tries offsets by successively perturbing one or more parameters (e.g., the sampling rate 303, the block size and/or the code frequencies) until, for example, either the code(s) 103 are successfully decoded or a pre-determined limit is reached. For example, the sampling rate 303 may be increased in 1 or 2 Hz increments until the code(s) 103 are successfully decoded or the tuning range limit of a clock 312 used to generate the sampling frequency 303 is reached. If the tuning range limit is reached, the sampling rate 303 may be reset to its nominal value and then decreased in 1 or 2 Hz decrements.

In other examples, a more error tolerant code such as the Nielsen NAES II codes may be decoded to determine a coarse frequency offset with subsequent fine frequency offset adjustments used to enable decoding of more sophisticated codes such as the Nielsen NAES V and NAES VI codes. For example, NAES II and NAES V and/or VI codes may be simultaneously present. The NAES II codes could be decoded first to determine coarse offset(s), with NAES V and/or VI codes subsequently detected to further refine the frequency offset(s). In other examples, a training phase with only NAES II codes present is followed by NAES V and/or VI codes. Adjustments to and/or selections of the block size and/or the code frequencies may likewise be tried.

Figure 6A:
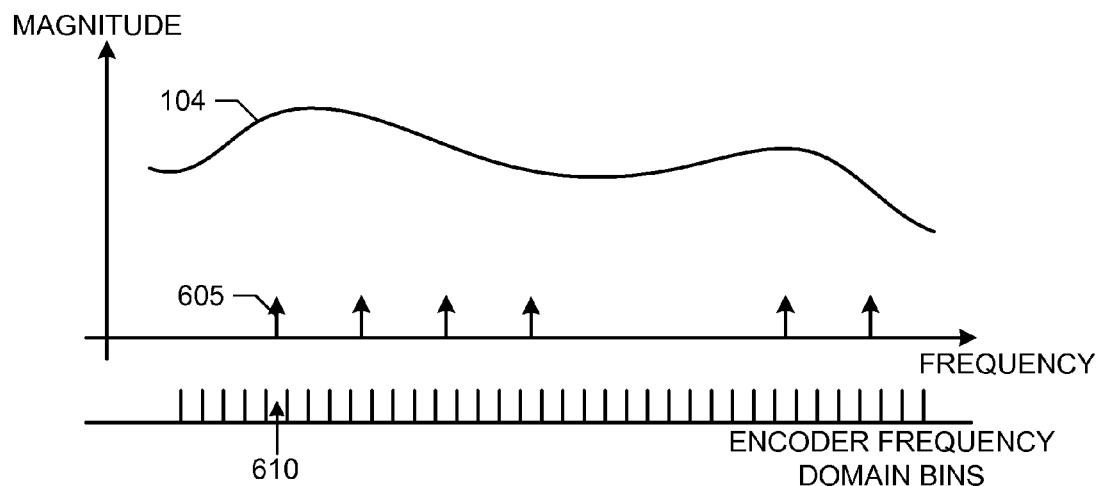
FIGS. 6A and 6B illustrate example frequency offsets that may be compensated for by the example decoder of FIG. 3.

FIG. 6A depicts an example having a code embedded in the audio 104 at a plurality of frequencies, one of which is designated at reference numeral 605. At the encoder 102, the frequencies 605 correspond to respective encoder frequency domain bins and/or indices, one of which is designated at reference numeral 610.

Figure 6B:
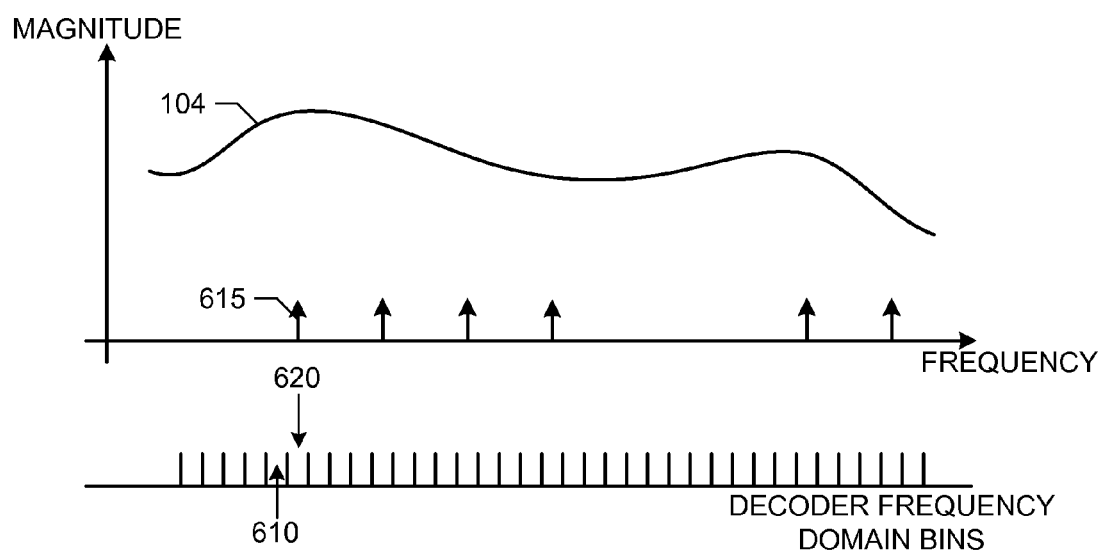

Mismatch(es) between any or all of the sampling frequency 202 (FIG. 2), the sampling frequency employed in the receiver 110 to output the encoded audio 105 via the speaker 114, and/or the sampling frequency 303 may cause discrepancies between the frequencies at which the encoder 102 embeds the code(s) 103 and the frequencies at which those embedded code(s) 103 appear at the decoder 116, as shown in FIG. 6B. For example, due to the mismatch(es), the code information embedded at encoder frequency 605 in FIG. 6A appears at an offset frequency 615 at the decoder 116, as illustrated in FIG. 6B. Thus, the code information does not appear in frequency domain bin and/or index 610 but rather in frequency domain bin and/or index 620. The other frequencies carrying the code information are likewise offset. Such an offset of code frequencies may lead to decoding errors.

A number of example methods to compensate for such offsets are described herein. In some examples, the sampling frequency 303 is adjusted and/or selected (e.g., increased or decreased from its nominal value) until the code(s) 103 are detected in the nominal frequency bins with suitable fidelity. In other examples, an offset set of frequency bins is used to detect and decode the code 103. For example, if a code is expected at nominal frequency indices {12, 20, 56}, the frequency domain decoder 306 could, for example, examine offset frequency indices {13, 21, 57}, {11, 19, 55}, {14, 22, 58}, etc. until the code(s) 103 are detected with suitable fidelity. In some examples, known codes may be used during calibration to facilitate determination the code detection fidelity. In other samples, a decoding metric such as a sum of normalized energies, a decoding validity verification, a decoding score, etc. may be used with known and/or unknown codes to determine and/or estimate decoding fidelity.

Additionally or alternatively, the block size used by the time to frequency domain converter 304 to compute the frequency domain representation 305 can be adjusted and/or selected. For example, the block size could be increased by a factor of two to double the number of frequency indices in which the code information may be detected. In this way, if a frequency offset moves code information near the boundary between two frequency indices the code information may be detected with increased fidelity. Of course, any combination(s) of the above methods may be used.

While an example manner of implementing the example decoder 116 of FIG. 1 has been illustrated in FIG. 3, one or more of the interfaces, data structures, elements, processes and/or devices illustrated in FIG. 3 may be combined, divided, re-arranged, omitted, eliminated and/or implemented in any other way. Further, any of the example sampler 302, the example time to frequency domain converter 304, the example frequency domain decoder 306, the example offset compensator 308 and/or, more generally, the example decoder 116 may be implemented by one or more circuit(s), device(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example sampler 302, the example time to frequency domain converter 304, the example frequency domain decoder 306, the example offset compensator 308 and/or, more generally, the example decoder 116 are hereby expressly defined to include a tangible computer-readable medium storing the firmware and/or software. Further still, the example decoder 116 may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
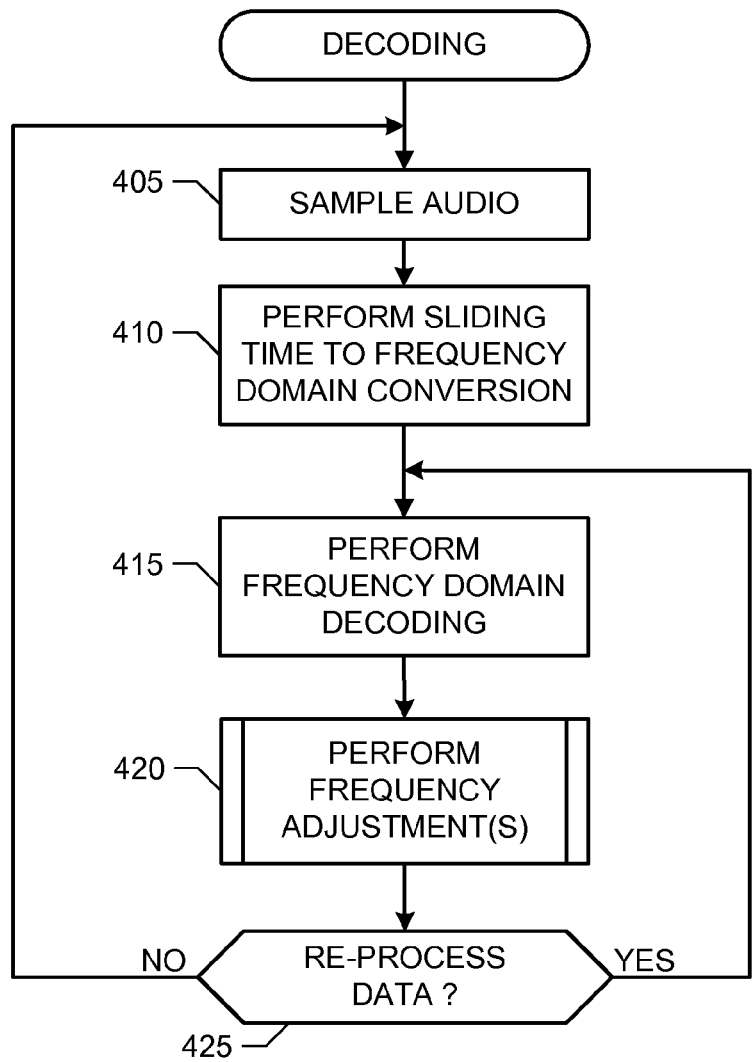
FIGS. 4 and 5 illustrate example processes that may be carried out by, for example, a processor, to implement the example decoders of FIGS. 1 and 3.
Figure 5:
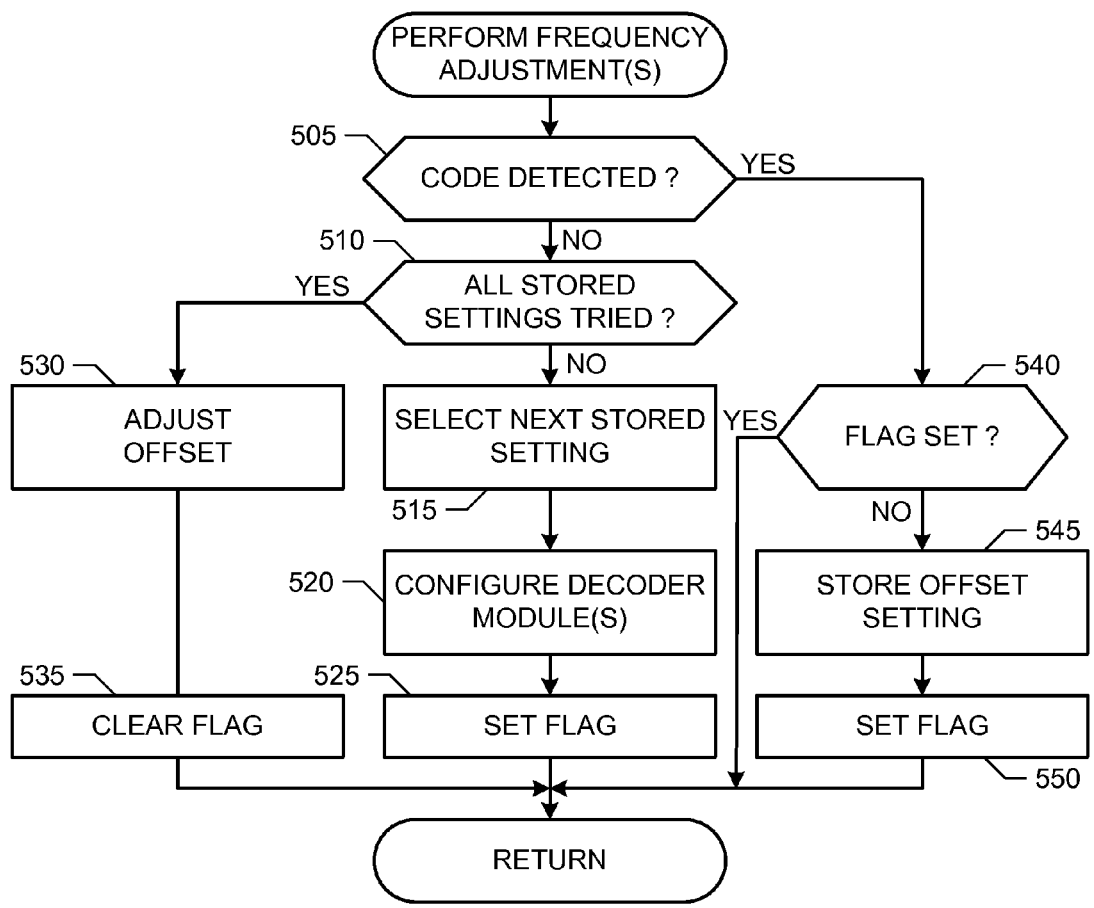

FIGS. 4 and 5 illustrate example processes that may be carried out to implement the example decoder 116 of FIGS. 1 and 3. A processor, a controller and/or any other suitable processing device may be used and/or programmed to carry out the example processes of FIGS. 4 and/or 5. For example, the processes of FIGS. 4 and/or 5 may be embodied in coded instructions stored on a tangible computer-readable medium such as a flash memory, a CD, a DVD, a floppy disk, a read-only memory (ROM), a random-access memory (RAM), a flash memory, a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium that can be used to store program code and/or instructions in the form of machine-readable instructions or data structures, and which can be accessed by a processor, a computer and/or other machine having a processor, such as the example processor platform P100 discussed below in connection with FIG. 7. Alternatively, some or all of the example processes of FIGS. 4 and/or 5 may be implemented using any combination(s) of ASIC(s), PLD(s), FPLD(s), FPGA(s), discrete logic, hardware, firmware, etc. Also, some or all of the example processes of FIGS. 4 and/or 5 may be implemented manually or as any combination of any of the foregoing techniques, for example, any combination of firmware, software, discrete logic and/or hardware. Further, many other methods of implementing the example processes of FIGS. 4 and/or 5 may be employed. For example, the order of execution of the blocks may be changed, and/or one or more of the blocks described may be changed, eliminated, sub-divided, or combined. Additionally, any or all of the example processes of FIGS. 4 and/or 5 may be carried out sequentially and/or carried out in parallel by, for example, separate processing threads, processors, devices, discrete logic, circuits, etc.

The example process of FIG. 4 begins with the example sampler 302 sampling received encoded audio 105 (block 405). The audio 105 may be obtained via an audio sensor, a hardwired connection, via an audio file, or through any other suitable technique. As explained above the sampling may be carried out at 48,000 Hz, or any other suitable frequency.

As each sample is obtained, a sliding time to frequency conversion is performed on a collection of samples including numerous older samples and the newly added sample obtained at block 405 (block 410). In some examples, a sliding DFT is used to process streaming input samples including 18,431 old samples and the one newly added sample. In some examples, the DFT using 18,432 samples results in a frequency domain representation 305 having a resolution of 2.6 Hz.

After the frequency domain representation 305 is obtained through the time to frequency conversion (block 410), the example frequency domain decoder 306 monitors code frequencies for embedded codes 103 and decodes any detected codes (block 415).

If the frequency adjustments selected and/or made by the offset compensator 308 are such that the current frequency domain representation 305 may be re-processed (e.g., to examine a different set of offset frequencies) (block 425), control returns to block 415 to perform additional frequency domain decoding, assuming that the frequency domain decoder 306 and/or the offset compensator 308 are able to complete their operations more than once between successive samples of the encoded audio 105.

If the frequency adjustments are such that the current frequency domain representation 305 cannot be re-processed (e.g., due to a change in the sampling frequency 303 and/or block size), (block 425), control returns to block 405 to collect one or more additional audio samples, as needed. If, for example, the sampling frequency 303 is changed (block 420), the entire buffer of audio samples is discarded and the buffer filled with new audio samples at the new sampling frequency 303 before the next frequency domain representation 305 is computed. If, for example, the block size is increased (block 420), one or more additional audio samples may need to be collected before the larger frequency domain representation 305 can be computed. However, if the sampler 302 and/or the time to frequency domain converter 304 retain extra audio samples (e.g., have a large enough buffer), the larger frequency domain representation 305 may be immediately computed using already available audio samples, depending upon the processing capability(-ies) of the time to frequency domain converter 304, the frequency domain decoder 306 and/or the offset compensator 308 to complete their operations more than once between successive samples of the encoded audio 105.

Depending on whether any codes 103 are detected at block 415, the example offset compensator 308 adjusts and/or selects a frequency offset by, for example, carrying out the example process of FIG. 5. Control then returns to block 415 to process the next block of samples.

The example process of FIG. 5 is carried out as the example frequency domain decoder 306 attempts to decode embedded codes 103. If the frequency domain decoder 306 was not able to detect and decode embedded codes 103 (block 505), the offset compensator 308 determines whether all previously successful offset stored in the list 310 have been tried (block 510). If not all stored offsets 310 have been tried (block 510), the offset compensator 308 selects the next stored offset 310 (block 515), correspondingly configures the sampling frequency 303, the block size and/or the code frequencies (block 520) and sets a flag (block 525) to indicate that the current offset being tried is already stored in the list 310. Control then exits from the example process of FIG. 5.

Returning to block 510, if all stored offsets 310 have been tried (block 510), the offset compensator 308 selects and/or computes a new offset to try (block 530) and clears the flag to indicate that a new offset is being tried (block 535). For example, successive offsets of the nominal frequency indices may be tried, successive changes of the sampling frequency 303 may be tried, and/or successive changes of the block size may be tried accordingly to any number and/or type(s) of search criterion(-ia), step size(s) and/or pattern(s). Control then exits from the example process of FIG. 5.

Returning to block 505, if codes are being successfully decoded (block 505) and the flag is not set (block 540), the current offset is stored in the list 310 (block 545) and the flag is set (block 550). Control then exits from the example process of FIG. 5. Returning to block 540, if the flag is set (block 540), control exits from the example process of FIG. 5 without storing the offset in the list 310.

Figure 7:
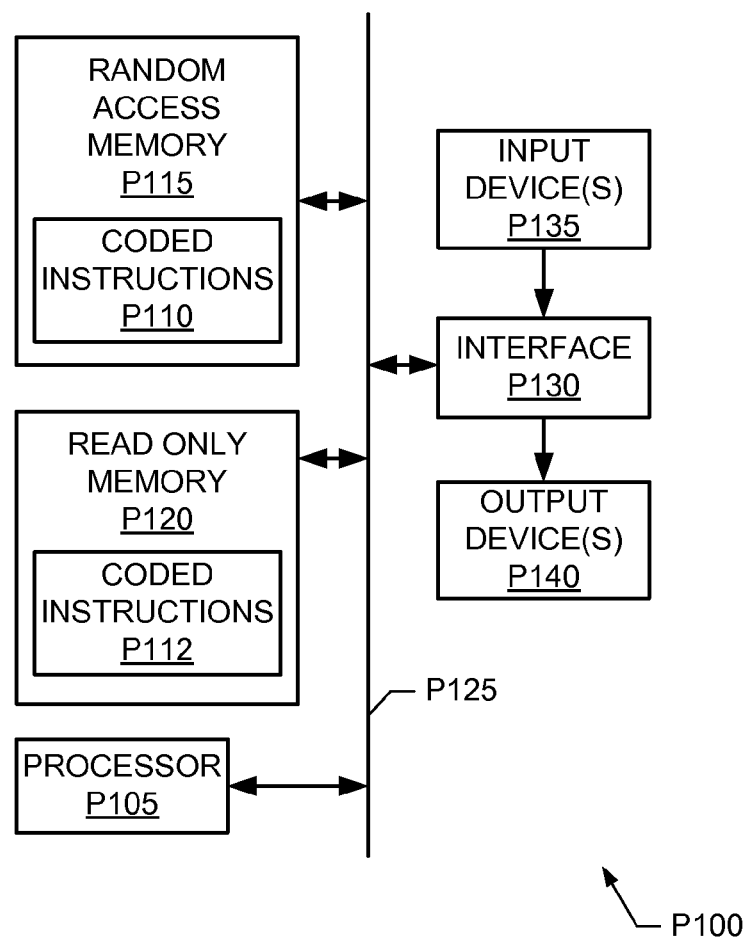
FIG. 7 is a schematic illustration of an example processor platform that may be used and/or programmed to implement the example processes of FIGS. 4 and 5 to implement the example decoder and/or the example offset compensator of FIGS. 1 and 3.

FIG. 7 is a schematic diagram of an example processor platform P100 that may be used and/or programmed to execute the example processes of FIGS. 4 and 5 and/or to implement the example decoder 116 of FIGS. 1 and 3. One or more general-purpose processors, processor cores, microcontrollers, etc may be used to implement the processor platform P100.

The processor platform P100 of the example of FIG. 7 includes at least one programmable processor P105. The processor P105 may implement, for example, the offset compensator 308 of FIG. 3. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 4 and 5 to decode audio watermarks as described herein. Thus, the coded instructions P110, P112 may include instructions representative of the example processes of FIGS. 4 and 5.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller. The example memory P115 may be used to, for example, implement the example offset database 310 (FIG. 3).

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The example input device P135 may be used to, for example, implement the example sampler 302.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:
1. A method comprising:
receiving an audio signal including an audience measurement code embedded therein using a first plurality of frequency components;
sampling the audio signal;

transforming the sampled audio signal into a first frequency domain representation;
determining whether the code is detected in the first plurality of frequency components of the first frequency domain representation;
when the code is not detected in the first plurality of frequency components, examining a second plurality of frequency components of a second frequency domain representation of the sampled audio signal to determine whether the code is detected, the second plurality of frequency components being offset from the first plurality of frequency components by a first offset, the first offset corresponding to a first sampling frequency mismatch; and
when the code is not detected in the second plurality of frequency components, examining a third plurality of frequency components of a third frequency domain representation of the sampled audio signal to determine whether the code is detected, the third plurality of frequency components being offset from the first plurality of frequency components by a second offset different than the first offset, the second offset corresponding to a second sampling frequency mismatch.

2. A method as defined in claim 1, wherein the second frequency domain representation comprises the first frequency domain representation.

3. A method as defined in claim 1, further comprising selecting each of the second plurality of frequency components to be adjacent to a corresponding one of the first plurality of frequency components.

4. A method as defined in claim 1, further comprising selecting a first of the second plurality of frequency components to have a narrower bandwidth than a first of the first plurality of frequency components.

5. A method as defined in claim 1, further comprising adjusting a frequency associated with the sampling of the audio signal to select the second plurality of frequency components.

6. A method as defined in claim 1, further comprising selecting a parameter used in transforming the sampled audio signal into the second frequency domain representation based on the first offset.

7. A method as defined in claim 1, further comprising selecting the first offset from a list of offsets.

8. A method as defined in claim 1, further comprising adding the first offset to a list of offsets when the code is detected in the second plurality of frequency components.

9. An apparatus comprising:
an audio input interface to receive an audio signal including an audience measurement code embedded therein using a first plurality of frequency components;
a sampler to sample the audio signal;
a time-to-frequency domain converter to transform the sampled audio signal into a first frequency domain representation; and
a frequency domain decoder to determine whether the code is detected in the first plurality of frequency components of the first frequency domain representation, and when the code is not detected in the first plurality of frequency components, examine a second plurality of frequency components of a second frequency domain representation of the sampled audio signal to determine whether the code is detected, the second plurality of frequency components being offset from the first plurality of frequency components by a first offset, the first offset corresponding to a first sampling frequency mismatch, and when the code is not detected in the second plurality of frequency components, the frequency domain decoder to examine a third plurality of frequency components of a third frequency domain representation of the sampled audio signal to determine whether the code is detected, the third plurality of frequency components being offset from the first plurality of frequency components by a second offset different than the first offset, the second offset corresponding to a second sampling frequency mismatch.

10. An apparatus as defined in claim 9, further comprising an offset compensator to select the first offset from a list of offsets.

11. An apparatus as defined in claim 9, further comprising an offset compensator to add the first offset to a list of offsets when the code is detected in the second plurality of frequency components.

12. An apparatus as defined in claim 9, further comprising an offset compensator to select a parameter used in transforming the sampled audio signal into the second frequency domain representation based on the first offset.

13. An apparatus as defined in claim 9, further comprising an offset compensator to select the second plurality of frequency components to be adjacent to a corresponding one of the first plurality of frequency components.

14. An apparatus as defined in claim 9, further comprising an offset compensator to configure a first of the second plurality of frequency components to have a narrower bandwidth than a first of the first plurality of frequency components.

15. A storage device or storage disc storing machine-readable instructions that, when executed, cause a machine to at least:
receive an audio signal including an audience measurement code embedded therein using a first plurality of frequency components;
sample the audio signal;
transform the sampled audio signal into a first frequency domain representation;
determine whether the code is detected in the first plurality of frequency components of the first frequency domain representation; and
when the code is not detected in the first plurality of frequency components, examine a second plurality of frequency components of a second frequency domain representation of the sampled audio signal to determine whether the code is detected, the second plurality of frequency components being offset from the first plurality of frequency components by a first offset, the first offset corresponding to a first sampling frequency mismatch; and
when the code is not detected in the second plurality of frequency components, examine a third plurality of frequency components of a third frequency domain representation of the sampled audio signal to determine whether the code is detected, the third plurality of frequency components being offset from the first plurality of frequency components by a second offset different than the first offset, the second offset corresponding to a second sampling frequency mismatch.

16. A storage device or storage disc as defined in claim 15, wherein the machine-readable instructions, when executed, cause the machine to select each of the second plurality of frequency components to be adjacent to a corresponding one of the first plurality of frequency components.

17. A storage device or storage disc as defined in claim 15, wherein the machine-readable instructions, when executed, cause the machine to select a first of the second plurality of frequency components to have a narrower bandwidth than a first of the first plurality of frequency components.

18. A storage device or storage disc as defined in claim 15, wherein the machine-readable instructions, when executed, cause the machine to adjust a frequency associated with the sampling of the audio signal to select the second plurality of frequency components.

19. A storage device or storage disc as defined in claim 15, wherein the machine-readable instructions, when executed, cause the machine to select a parameter used in transforming the sampled audio signal into the second frequency domain representation based on the first offset.

20. A storage device or storage disc as defined in claim 15, wherein the machine-readable instructions, when executed, cause the machine to select the first offset from a list of offsets.

21. A storage device or storage disc as defined in claim 15, wherein the machine-readable instructions, when executed, cause the machine to add the first offset to a list of offsets when the code is detected in the second plurality of frequency components.

* * * * *